Feb. 27, 1923.

J. M. WILLIAMS, JR

AIRCRAFT WHEEL HOUSING

Filed July 29, 1919

1,446,531

2 sheets-sheet 1

Inventor
John M. Williams Jr
By Robert H. Young
Attorney

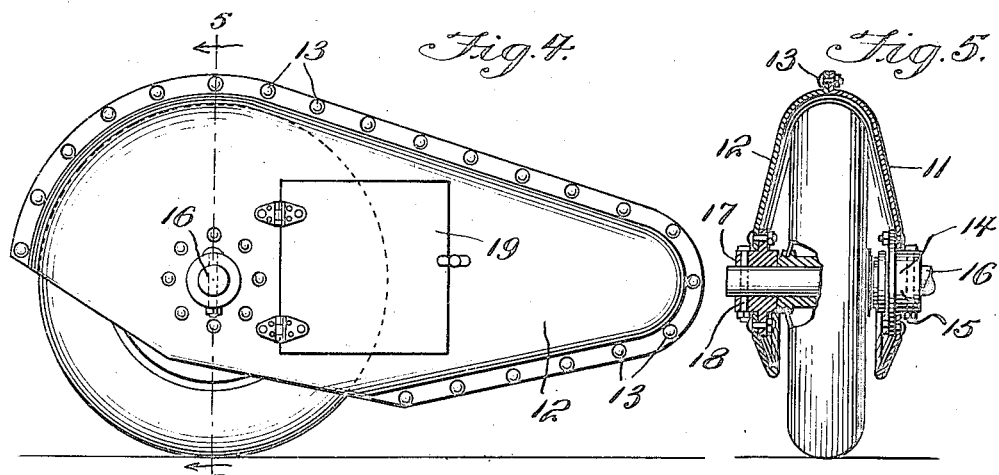
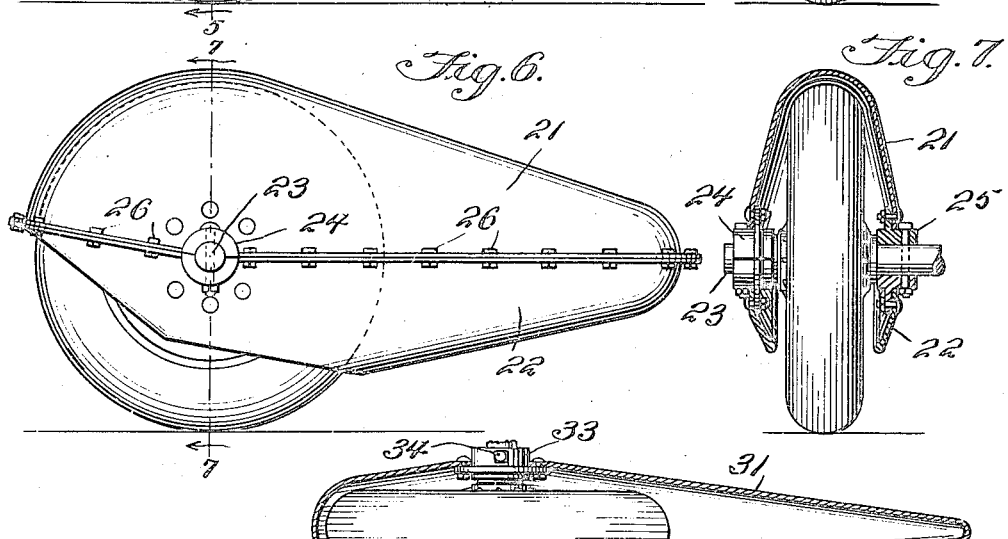
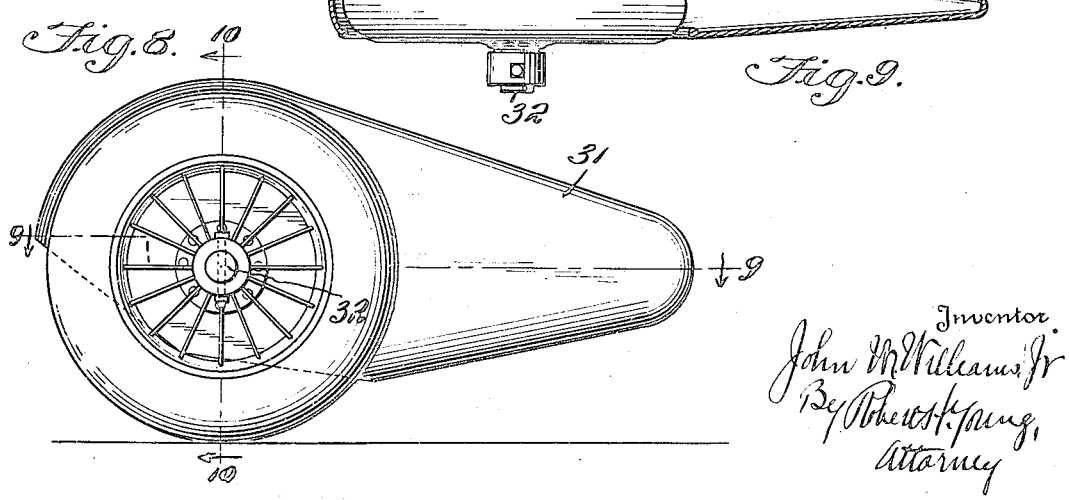

Patented Feb. 27, 1923.

1,446,531

UNITED STATES PATENT OFFICE.

JOHN M. WILLIAMS, JR., OF GREENWICH, CONNECTICUT.

AIRCRAFT-WHEEL HOUSING.

Application filed July 29, 1919. Serial No. 314,156.

*To all whom it may concern:*

Be it known that I, JOHN M. WILLIAMS, Jr., a citizen of the United States, residing at Greenwich, in the county of Fairfield and State of Connecticut, have invented certain new and useful Improvements in Aircraft-Wheel Housings, of which the following is a specification.

This invention relates to aircraft and, more particularly, to the provision of means which serve to reduce the parasite resistance of the landing-gear wheels, at the same time acting as an efficient mud-guard for the wings and propeller of the craft.

The resistance of the air to the rapid passage of the wheels on the landing-gear of an airplane is considerable due to their shape, which is not suited for efficient streamline flow of air past them; hence, the parasite resistance of the wheels is considerable. Various means have been used to help obviate this difficulty, such as filling in the space occupied by the spokes with a smooth covering, which however does not remedy the difficulty to any great extent, or drawing the entire landing-gear into the body of the machine, which latter construction presents certain mechanical difficulties.

The present invention comprises a housing or casing which encloses most of the landing-gear wheels except that part which would come in contact with the ground, the housing having a rearward extension which terminates substantially in a point, thus giving a perfect streamline effect and allowing the wheel to pass through the air with a minimum of resistance. The functions of the wheel are in no way interfered with, the same being entirely free to turn within the housing, while considerable protection at the same time, is afforded thereto.

Considerable difficulty has been experienced by the landing-gear wheels picking up mud and dirt while the machine is taxiing on the ground, spattering it over the bottom surface of the wings, and what is more serious, the mud sticking to the wheels is sometimes thrown forward, striking the propeller and breaking the same. The flat type of mud-guard which has been in use heretofore does not protect the wings, and furthermore, adds greatly to the resistance of the airplane to the air. The present invention aims to overcome these objections.

Other and further objects of the invention will appear as the nature of the same is better understood from consideration of the following description taken in conjunction with the accompanying drawings, which show the invention in several of its preferred form.

Figure 1:
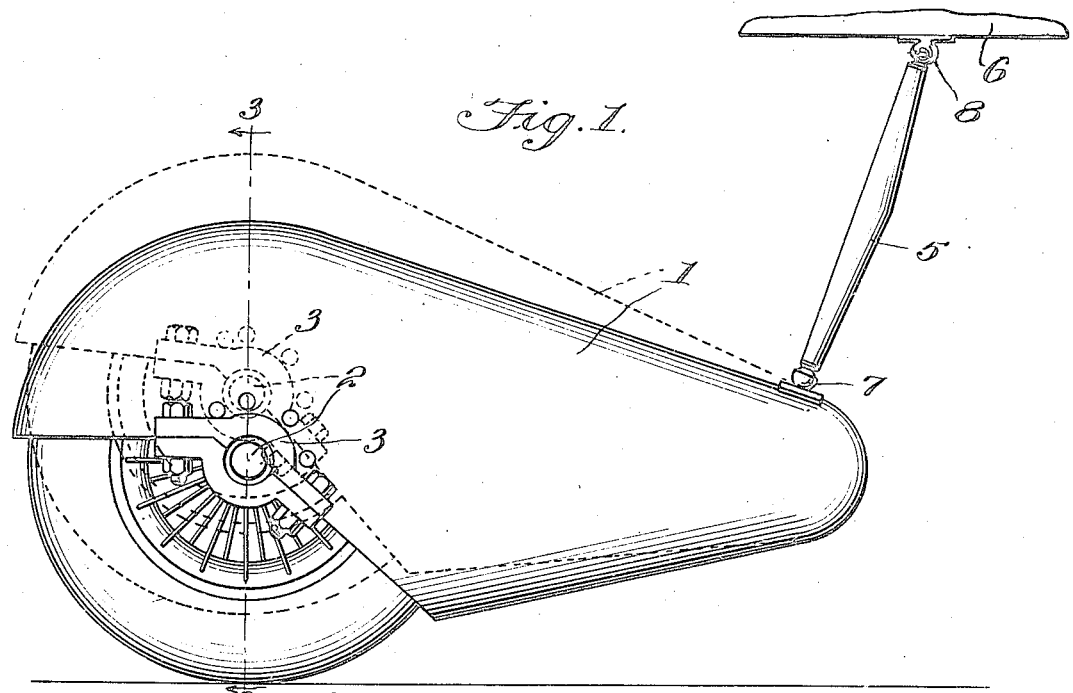

Fig. 1 illustrates a form of the invention particularly designed for use with the wheels of landing-gear of the type wherein the wheels are rigidly attached to and turn with the axle; the dotted lines in this view indicate the position, due to the action of the landing-gear shock absorbers, which the several parts assume when the airplane comes in contact with the ground.

Figure 2:
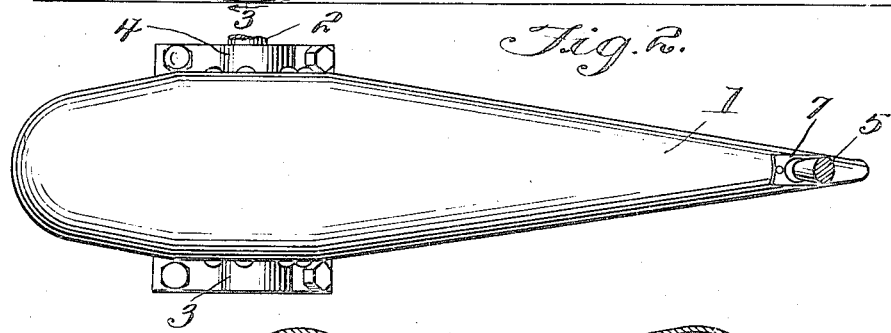
Figure 3:
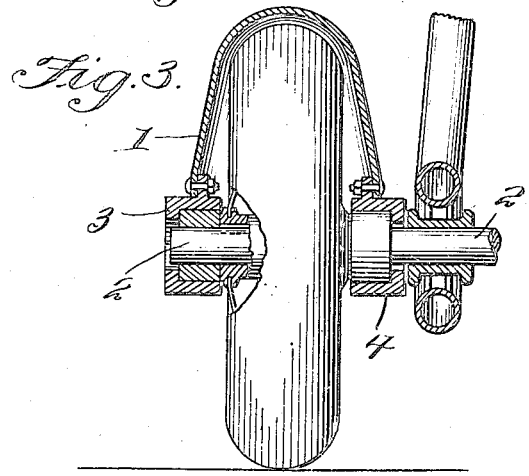
Figure 10:
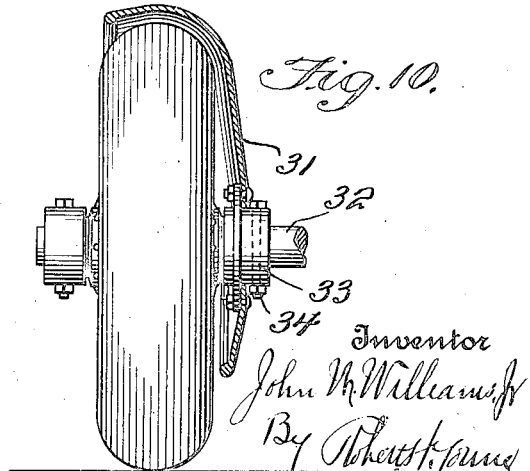

Fig. 2, a plan view of this form of the housing showing more clearly its streamline shape, Fig. 3, a section taken on line 3—3 of Fig. 1, showing in detail the manner in which the housing is mounted on the axle of the landing-gear, Fig. 4, a side elevational view of a form of the invention intended more particularly for use with the wheels of landing-gear of the non-rotating axle type, Fig. 5, a section taken on line 5—5 of Fig. 4, Fig. 6, is a side elevation of another form of the invention intended for use with the non-rotating axle gear, Fig. 7 is a section taken from line 7—7 of Fig. 6, Fig. 8, is a side elevation of another form of the invention which enables the landing-gear wheel to be removed without disturbing any part of the streamline housing, Fig. 9, is a section taken on line 9—9 of Fig. 8, and Fig. 10, is a section taken on line 10—10 of Fig. 8, showing more clearly the relation of the housing to the landing-gear wheel.

Referring to Figs. 1 to 3 inclusive, there is illustrated a construction of the wheel housing particularly designed for use with the wheels of landing-gear of the type having a rotating axle. The housing 1 is of streamline shape and, in this instance, is preferably made in a single piece of light metal or other suitable material. The lower portion thereof is provided with an opening designed to permit entry of the landing-gear wheel therein. It is intended, although the invention is not restricted thereto, that housing 1 shall be mounted directly on the landing-gear axle, which in the present case is of the rotating type; it is necessary, therefore, that housing 1 be attached to axle 2 by means of bearings 3 and 4. In order that housing 1 may be mounted on axle 2, after the landing-gear wheel is placed in position, bearings 3 and 4 are each provided in the form of two split collars, the upper halves of which are permanently bolted to housing 1. After housing 1 is placed in position over the landing-gear wheel and the upper halves of bearings 3 and 4 are resting in place on the upper side of axle 2, the lower halves of bearings 3 and 4 are bolted to the upper halves, thus securing the housing in position over the wheel. Mounted in this manner, housing 1 in no way interferes with the action of either the landing-gear wheel or axle, which latter members turn together. It is necessary, however, in so far as the connection of housing 1 with axle 2 is a rotating one, that some means be provided to support the rear end of the housing and prevent the possible turning of the same. This is provided in the form of a small strut 5 connecting the rear end of housing 1 with fuselage 6 by means of universal joints 7 and 8. The purpose of the universal joints is to accommodate the movements of the landing-gear parts and housing 1, due to the landing-gear shock-absorbers, when the machine comes in contact with the ground, the relative movements of the several parts being shown in dotted lines in Fig. 1.

The remaining figures, 4 to 10 inclusive, illustrate various forms of the invention, more particularly designed for use with the wheels of landing-gear having non-rotating axles. This does away with the necessity of providing bearings at the connections of the housing with the landing-gear axle and a strut or other means for supporting and preventing the rotation of the same.

Figs. 4 and 5 illustrate a form of the invention wherein the wheel housing is made in two halves 11 and 12, secured together by means of a series of bolts 13. With this form of housing, the inside half 11 is first placed in its proper position on the axle, being rigidly held in place by means of a collar 14 with which it is provided, and a bolt 15 which passes through said collar and axle 16. The landing-gear wheel is then placed on axle 16, and the outside half 12 of the housing mounted in position and secured to the inner half 11 by means of bolts 13. A collar 17 similar to the one provided on the inner half of the housing is provided on the outer half 12, and is adapted to be secured on axle 16 by means of bolt 18 passing therethrough. It will thus be seen that it is only necessary to remove the outer half 12 of the housing in case it is desired to gain access to or remove the landing-gear wheel.

Figs. 6 and 7 illustrate the manner in which a housing similar to that shown in Figs. 4 and 5, may be made in two parts, the housing being split horizontally instead of vertically as in the form just described. With this form, the upper and lower parts of the housing 21, 22, may be mounted in position after the landing-gear wheel has been placed on the axle 23, by making the bearings 24 and 25 in the form of two split collars, the upper halves of which are permanently attached to the upper part 21 of the housing, and the lower halves to the lower part 22. The landing-gear wheel having been placed on axle 23, the upper part 21 of the housing is placed in position. The lower part 22 is then brought in position and bolted to the upper part 21 by means of a series of bolts 26 and suitable bolts connecting the two halves of each of the bearings 24 and 25. In order to hold the housing in position and prevent the dropping of the rear end thereof, each of the bearings 24 and 25 is provided with a bolt which passes through and secures the bearing, and thus the housing, to axle 23.

Figs. 8 to 10, inclusive, show a modification of the form of housing shown in Figs. 4 and 5, housing 31 in this case being secured to axle 32 on the inner side of the wheel only by means of collar 33 to which it is rigidly attached. A bolt 34, passing through collar 33 and axle 32 secures the bearing, and thus the housing 31, rigidly in position and prevents the same from turning. In this form of the housing, the outer face of the same is cut away substantially the diameter of the landing-gear wheel in order to permit the removal of the same without disturbing any part of the housing. The outer face of the landing-gear wheel thus remains uncovered, rendering it always accessible for inspection and readily removable. This form of the housing forms a fairly good streamline shape, but would probably operate more efficiently if the outer face of the landing-gear wheel were provided with the usual streamline covering.

In those forms of the invention where the outer face of the landing-gear wheel is substantially covered by the housing, it may be necessary to provide a door or other suitable opening 19, Fig. 4, in the outer face of the housing whereby access may be had to the landing-gear wheel.

While the details of construction of several forms of the invention have been described more or less precisely, this has been done in order to give an idea as to the manner in which the streamline housing may be mounted about the landing-gear wheel, and, is not intended to limit the scope of the invention to the construction shown, as this would be governed considerably by the type of machine and landing-gear axle on which the housing is to be mounted; changes in the form, the proportion of parts, and the substitution of such equivalents as circumstances may suggest or render expedient may be made without departing from the spirit of the invention.

What I claim is:

1. In combination with an aircraft landing gear wheel, a wheel housing of streamline formation movable bodily with said wheel, a strut flexibly connecting said housing with the body of the aircraft, and shock absorbing means permitting said wheel and housing to yield relatively to the body of the aircraft.

2. In combination with an aircraft landing gear wheel, a wheel housing movable bodily with said wheel and comprising a hollow body of streamline formation having an opening therein to expose a portion of the wheel, a strut connecting said housing and the body of the aircraft and adapting said housing to yield in relation to the latter, and shock-absorbing means between said wheel and the fuselage of the aircraft.

3. In combination with an aircraft landing gear wheel, a wheel housing movable bodily with said wheel and comprising a hollow body of streamline formation having an opening therein to expose a portion of the wheel, a strut having a jointed connection with said housing and also with the body of the aircraft, and shock absorbing means between said wheel and the fuselage of the aircraft.

4. A housing for an aircraft landing-gear wheel, comprising in combination, a main body portion of streamline form, said body portion being provided with an opening therein whereby said wheel may contact with the ground, split bearings for detachably mounting said body portion on the landing-gear axle, and a strut for preventing rotation of said body portion, said strut extending between and connected to said body portion and the aircraft by means of universal joints.

In testimony whereof I have affixed my signature.

JOHN M. WILLIAMS, Jr.